July 2, 1940.  W. D. FOSTER  2,206,032
FILM MAGAZINE AND APPARATUS FOR USE THEREWITH
Filed Aug. 26, 1938 3 Sheets-Sheet 1
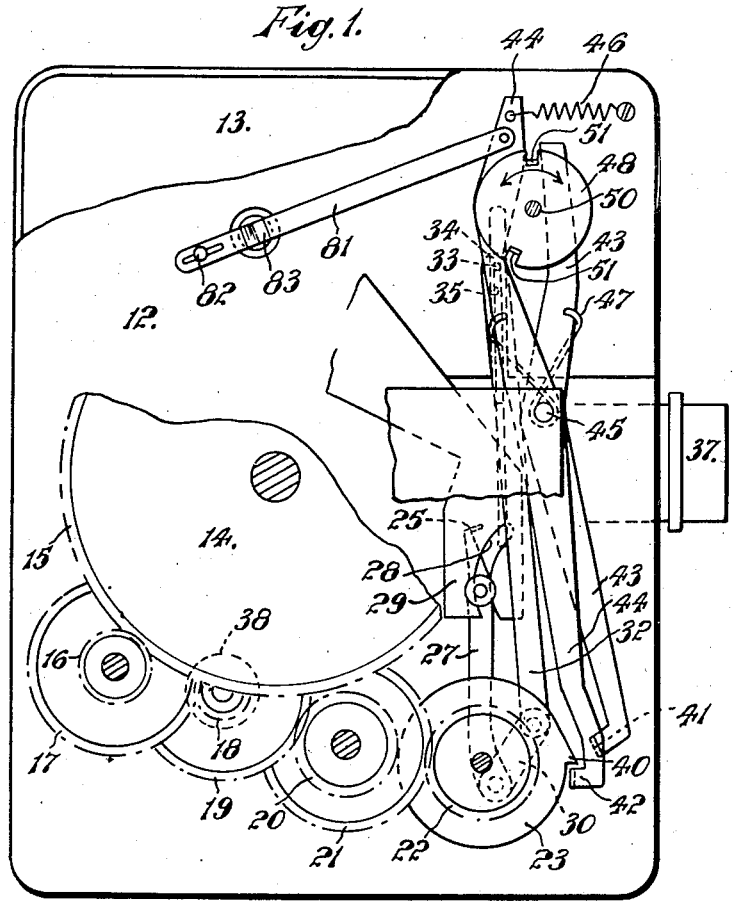
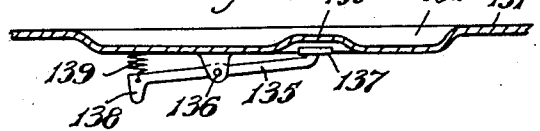
Inventor
Warren Dunham Foster

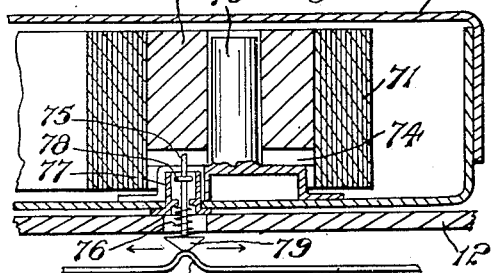
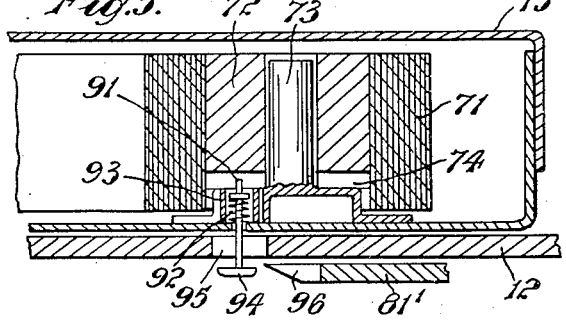
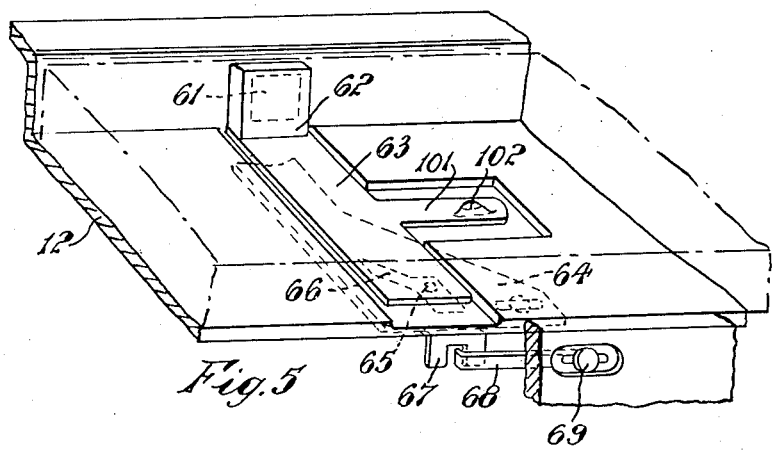

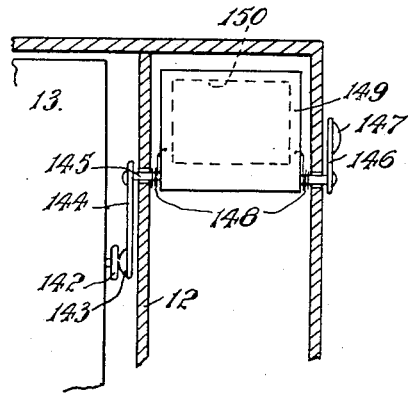
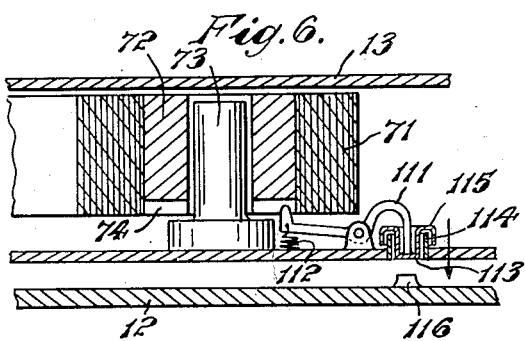
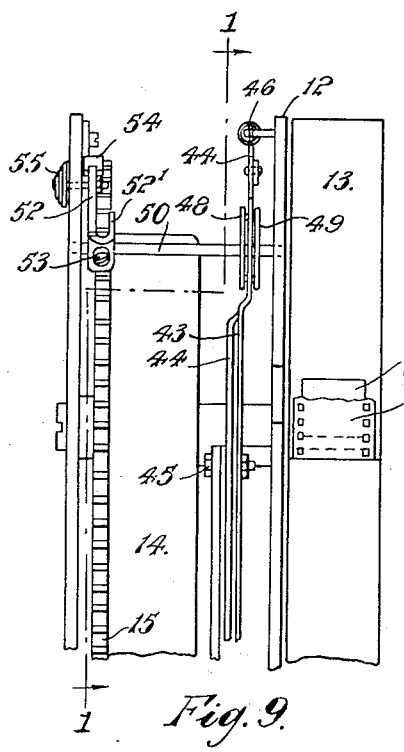
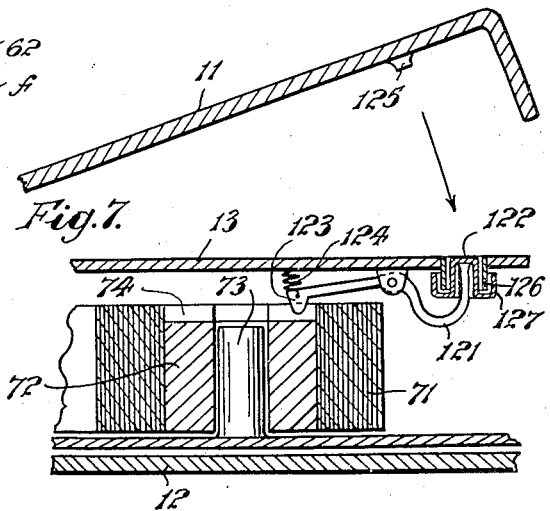

Patented July 2, 1940

2,206,032

UNITED STATES PATENT OFFICE 2,206,032

FILM MAGAZINE AND APPARATUS FOR USE THEREWITH

Warren Dunham Foster, Ridgewood, N. J.

Application August 26, 1938, Serial No. 227,006
In Great Britain August 26, 1937

31 Claims. (Cl. 88—17)

This invention may be applied to any art in which a film or other ribbon-like material is fed from one support to another. It is particularly adapted for use in connection with magazines which house a photographic film especially for use in a motion picture apparatus or in any film handling apparatus in which a series of pictures upon a film or the like are exposed or projected.

In amateur cinematography the use of self-loading film magazines is rapidly increasing. The manufacturer places a film within a magazine in such manner that it extends from a delivery mass across an opening and into contact with a taking-up member. If for camera use the magazine is light tight. The magazines are then stocked by dealers who sell them to the users. The user places the magazine within his camera or projector and makes the required manipulations if any. A film advancing claw or the like of the apparatus engages the film at an opening of the magazine, and a motion-transmitting element of the apparatus makes the necessary contact with the taking-up member. In many cases the user does not actually touch the film as the threading is automatically accomplished. When the user starts the mechanism of the apparatus the film is intermittently drawn from the delivery mass across the exposure opening and wound upon the taking-up member. Now that amateur cinematographers make use of films of different types and different sensitivity, the user of a magazine camera is likely to take one magazine containing one type of film out of his camera, insert another, and later re-insert the first, as he can do in an instant and with a negligible loss of film, if any.

As the magazine is handled by the manufacturers, dealers and users, the film upon the delivery mass is very likely to unwind somewhat. The magazines are necessarily made compact and with close clearances. The natural elasticity of the film upon the delivery mass is such that if it is not firmly held in position it is likely to unroll sufficiently to clog its pathway and to impede later regular withdrawal by the mechanism of the film handling apparatus. In order to avoid this difficulty it has already been proposed to lock the delivery mass into position and then manually to unlock it before the magazine is placed in the camera for use. This arrangement overcomes only a portion of the difficulties and causes other difficulties. The unwanted unrolling of the film from the delivery mass is just as likely to take place and indeed more likely to take place after the magazine has been positioned within the camera as before and if the locking mechanism for the delivery roll is rendered inoperative when the magazine is put into the camera it will be readily understood that there is no safeguard against unrolling. One of the most frequent causes of trouble in the operation of one of the popular types of amateur magazine cameras is caused by the user unlocking the film, putting the magazine in the camera, taking a "shot" or two, and then placing the camera, of course with magazine in place, in his automobile and driving on. The vibration of the automobile coupled with natural elasticity of the film causes the delivery mass to unwind and when next the camera is used the film is very likely to jam in the magazine. One manufacturer recommends that whenever a user takes his camera in an automobile he remove the magazine, lock the film and then when he wishes to take more pictures unlock the film and reload the camera. Obviously such procedure removes several of the important advantages of the magazine type of camera. Also the unlocking of the film if by an isolated hand operation may be forgotten by the user and in any event it is one more thing to which he must give attention and hence is undesirable.

In professional cameras and to a less extent in projectors film locking devices have been proposed and used in the past, but under substantially the same difficulties as those stated above.

A primary object of my invention is to provide simple mechanism for holding the film locked in position in a magazine at any and all times when the film should not move for the purpose of the exposure or projection of a picture and automatically rendering such film locking device inoperative when a picture is to be taken or projected.

Also a primary object of the invention is to render the film locking device immediately and automatically operative at the conclusion of a picture taking or projecting operation so that at all times when the film is not in actual operation it is held firmly in place.

According to the invention, in cinematograph apparatus including and utilising a film magazine, the magazine having means for locking the film against movement within the magazine, the film locking means is so co-ordinated with the apparatus that the film locking means, after the magazine has been placed in position within the apparatus, is operated by starting or stopping the use of the apparatus or by an operation for placing the apparatus in or out of working order.

In a preferred form of the invention I operate this locking device in cooperation with the means for rendering the film moving means alternatively operative and inoperative. It may however operate in timed relation to the closing and opening of the gate or of the movement of the presser member. In still another embodiment of the invention the lock is operated from the exterior of a camera by manual means which preferably include a signalling device so that the user as a practical matter will not attempt to start the operation of his apparatus until he has unlocked the film ready for use. To accomplish the above mentioned signalling I operate a shutter by a movement of the locking device in such a manner that a view finder of the camera cannot be used until the film is unlocked. Since in ordinary practice the user looks through his view finder before he tries to take a picture this device ensures the proper operation of the lock.

Another and important object of my invention is to provide improved means per se for locking and unlocking the film within a film magazine irrespective of the manner of control. Locking devices commonly now in use include a member which projects beyond the periphery of the magazine casing. According to one form of my invention the entire operating mechanism is within a bounding surface of the magazine. Hence there is less liability of injury and no interference with the easy stacking of the magazines. In another form of my invention locking devices are provided which are operable from exterior of a magazine but have no member which passes through the surface of the magazine thus making light proofing unnecessary.

Further objects of my invention will be found in the improved mechanical construction of the various parts.

Other advantages, characteristics and objects of my invention will be evident from the following portion of this specification, the drawings and the subjoined claims. It will be readily understood by those familiar with the art that I am presenting certain preferred forms of my invention only for purposes of illustration and that changes therein may be made without departing from the spirit of the invention or the scope of the broader claims.

Figure 1 is a sectional view taken on the line 1—1 of Figure 9 looking in the direction of the arrows and showing a camera with a magazine in position therewithin and the mechanism for controlling the locking device for the film. Certain parts have been omitted for clarity.

Figure 2 is a detailed sectional view showing a film locking device in contact with a mass of the film.

Figure 3 shows a preferred modification of a film locking device and operating mechanism therefor.

Figure 4 is a bottom plan of a detail of Figure 3.

Figure 5 shows in perspective a preferred modification in which the locking device is operated by movement of a gate.

Figure 6 shows in section a preferred modification in which a locking device is operated merely by the act of placing the magazine in its position within the camera.

Figure 7 shows in section another preferred modification in which the closing or opening of the cover of a film handling apparatus renders the locking device alternatively inoperative and operative.

Figure 8 is a sectional view of a preferred modification of a locking device.

Fig. 9 is an end view corresponding to Fig. 1 of the chassis of the apparatus, certain parts including the outer casing being omitted for clarity.

Fig. 10 shows a modification in which the locking device is operated by a shutter for a view finder.

For purposes of illustration I am showing my invention as applied to an amateur camera and magazine of the Morsbach type but it will be readily understood that it can be applied equally well to any other suitable type of camera or film container, professional or amateur, and to a projector of the magazine type. Neither magazine nor apparatus as such forms a part of the present invention but both must be described in large part in order to make clear the construction and operation of the locking device and the control mechanism therefor which do comprise the subject matter of the invention.

The camera may consist of a quadrilateral casing with a hinged cover member 11 and a main transverse plate 12 upon which a magazine generally indicated as 13 may be seated. Operating mechanism is housed on the side of this plate 12 opposite that which receives the magazine. The driving portion of this mechanism consists of a spring 14 surrounded by and movable with a pinion 15 which meshes with a gear 16 coaxial and movable with a gear 17 which in turn operates connected coaxial gears 18 and 19. Gear 19 operates gear 20 with which gear 21 is movable. Gear 21 in turn meshes with gear 22 which operates a driving disc 23.

This disc 23 drives a feeding claw or tooth 25 which intermittently feeds a film forwardly. This claw is mounted on the end of a link 27 working in a curved slot 28 formed in an intermediate supporting plate 29. At its end opposite the tooth 25 the link 27 is pivotally connected to the free end of a short arm 30 which is pivotally mounted by its other end upon the main driving disc 23. It will be seen that the revolution of the disc 23 in a clockwise direction intermittently feeds the film forwardly.

A reciprocating shutter is driven in timed relation to the intermittent feeding member. A link 32 pivotally mounted upon the main driving disc 23 is guided at its upper end by means of a pin 33 working in a slot 34. Depending from this pin is a long shutter blade 35 with an opening, not shown, which in timed relation to the movement of the claw 25 alternatively permits light from a lens 37 to reach the film and cuts it off. This shutter is so timed that when the feeding mechanism is maintained in the inoperative position light cannot reach the film.

A take-up member 38 revoluble with the gears 18 and 19 is likewise driven by the spring 14 in order to wind up the film upon the take-up mass within the magazine. Any desired or conventional means of releasably and frictionally coupling the member 38 to the mass within the magazine may be employed.

To start and stop the operation of the claw, shutter and take-up the mechanism shown in Figs. 1 and 9 may be employed.

Formed in the periphery of the driving disc 23 is a projection 40 which is engageable with dogs 41 and 42 respectively formed in the lower end of control arms 43 and 44 respectively as shown in the drawings. These arms are pivotally mounted upon a stud 45 and springs 46 and 47 hold them in the positions shown in Fig. 1. It will be seen that upon the movement of the upper portion of the arm 44 alone to the left as shown in Fig. 1 the dog 42 will be withdrawn from holding relation to the projection 40 and the spring 14 will start the operation of the camera to take a series of pictures in motion. Movement of the upper portion of the arm 43 to the right as shown in Fig. 1 will place the dog 41 in stopping position for the projection 40. Coupled to this movement of the arm 43 through mechanism later to be described is movement of the upper portion of the arm 44 to the left so that the projection 40 is freed and permitted to make almost a complete revolution until it is stopped by the dog 41 thus exposing a single picture.

Mechanism shown in Figs. 1 and 9 is employed to shift these arms and thus start and stop the operation of the camera. Two discs 48 and 49 are mounted for rotation upon a shaft 50. Short struts 51 with which the upper portions of the arms 43 and 44 are engageable join these discs so that upon their conjoint movement in an anti-clockwise direction the dog 42 is removed from holding relation with the projection 40 and motion pictures may be taken and upon their revolution in a clockwise direction the dog 42 is removed from holding relation and the dog 41 placed in position ready to stop the operation of the apparatus after substantially one revolution whereby a single or still picture is exposed. It will therefore be understood that rotation of the discs in either direction causes one of the struts 51 to operate the arm 44 but that rotation of the disc in an anti-clockwise direction is without effect upon the still picture arm 43.

Fig. 9 shows the manner in which the shaft 50 is operated in order to rotate the control discs as described above. A segment 52 with a lower upturned narrowed portion 52¹ by means of a screw 53 is attached to and rotates the shaft 50. Segment 52 may be held in a position to continue the operation of the apparatus to take motion pictures by a spring pressed pawl 54 which engages a projection in the top of the segment. A control button 55 is joined to the segment 52 by means of a pin operating in an arcuate slot. It will thus be seen that the movement of the control button 55 operates the apparatus in the manner desired.

As is best shown in Figure 5 of the drawings a simple gate is provided which consists of a fixed apertured member 61 and a movable member 62 upon which is mounted a usual or conventional spring presser member not shown. The movable gate member is mounted upon a flat irregularly shaped plate 63 movable within an appropriate depression in the plate 12. Mounted for movement upon the under side of the transverse support 12 as shown in Figure 5 is a flat control plate 64 which through a pin 65 depending from the plate 63 and working within a cam slot 66 cut in the plate 64 transmits the motion of the plate 64 and operates the movable gate member 62. It will readily be understood that the movement of the plate 64 to the right and left respectively as seen in Figure 5 opens and closes the gate. A portion 67 of this plate is turned downwardly as viewed in Figure 5 and formed with a notch with which interfits a link 68 which may be moved by a button 69. This button also controls a lock not shown for the camera cover.

I have now described the mechanism of the film handling apparatus itself and shall proceed to describe a magazine and film locking member therefor which may be used with this camera.

The magazine itself comprises essentially a quadrilateral metal box consisting of a body member and a cover member. It may be of the sort described and claimed in British Patent Number 371,698 or in the corresponding United States Patent application Serial Number 542,034, filed June 4, 1931, which upon May 30, 1939, matured as Patent Number 2,159,998. A delivery mass generally indicated as 71 may be wound upon a metallic bobbin 72 rotatable upon an axle 73. It will be understood that film from this delivery mass passes across a recess in the magazine into which and back of the film the movable gate member 62 fits when the magazine is in position within the camera and by the revolution of the take-up member 38 is wound upon a take-up mass. Cut in the top of the bobbin 72 is a slot 74 with which a lock cooperates.

As shown in Figure 2 this lock may consist of a locking plunger 75 normally moved away from locking position by a spring 76. This plunger operates in a light proofing barrel 77 and carries a disc 78 which assists in preventing light leakage and consequent fogging of the film and also limits the movement of the plunger. An operating head 79 projects outwardly. A recess not shown may be stamped within the cover of the magazine so that when the lock is held in locking position it does not extend beyond the periphery of the magazine as a whole. When the magazine is out of the camera a spring clip or other device not shown may be employed to hold the lock in locking position.

I show one slot 74 into which the locking member fits. If at the time the lock is operated the plunger is not disposed opposite the slot the pressure of the spring will either be sufficient for the plunger to hold the bobbin in position or the elasticity of the film will rotate the bobbin sufficiently for the plunger to engage the slot. In either case the object of the locking device is accomplished.

To operate the lock according to the form of the invention shown in Figure 2 a control arm 81 is provided linked to the arm 42 and guided by a pin 82 working in a slot. A cam surface 83 is formed in the arm 81 and engages the head 79 of the lock. It will thus be seen that while the cam surface is in the position shown in Figure 1 the lock is held in locking position but when the control arm 81 by the movement of the arm 42 is moved so that the feeding device becomes operative the lock is immediately rendered inoperative since the spring 76 as soon as the head 79 is freed from the cam surface 83 moves the plunger 75 away from the bobbin 72. When however the user moves the button 55 to the stop position the cam surface 83 immediately re-engages the head 79 and locks the film against motion.

An alternative structure is shown in Figure 3. In this case a locking plunger 91 is normally pressed into locking position by a spring 92 operating in a light trapping barrel 93, a head 94 passing through an opening 95 in the transverse supporting plate 12 of the camera. A control member 81¹ corresponding to the control member 81 is provided which terminates in a cam surfaced bifurcated formation 96 which upon the movement of the control member 81¹ to the left as shown in the drawings engages the head 94 and raises it so that the locking plunger 91 is placed in the unlocked position. Thus when the user starts operation of the camera he at once unlocks the film and when he stops this operation he immediately causes it again to be locked.

The operation of the form of the invention shown in Figure 5 will be clear from the following.

The gate operating plate 63 is provided with a projecting portion 101 upon which is formed a cam surface 102. As the magazine is placed within the camera the gate is of course in open position and the cam surface 102 and the head 79 of the locking plunger 75 are spaced and hence the lock remains operative. When the movable gate section 62 is moved to the closed position however the cam surface 102 is moved into contact with the head 79 so that the lock is rendered inoperative and the film may be fed.

If desired, the movable gate member and the film feeding mechanism may be so inter-related that the film may not be fed until the gate is closed, as taught in British Patent Number 405,333 or United States Patent Number 1,868,252. Thus the film will be kept locked until the feeding operation is about to commence.

Figures 6 and 7 show forms of the invention in which a lock for the film mass is rendered inoperative when the magazine is placed within the camera or when a cover thereof is closed respectively. Figure 6 shows a magazine 13 in which the locking member is a toggle arm 111 pressed by a spring 112 into locking position and having a head 113 which is normally flush with the surface of the magazine. A light barrel 114 cooperating with the reverse-curved surfaces 115 movable with the head 113 prevents the fogging of the film. A projection 116 is formed upon the plate 12 of the camera so that as the magazine is placed into position in the camera the locking plunger is automatically rendered inoperative and the delivery coil may be unwound.

In the form of the invention as shown in Figure 7 a similar toggled locking member is employed but in this instance is operated by a projection formed upon the cover 11 of the camera. A toggle 121 includes a head 122, a locking pin 123 and a spring 124. As the cover 11 is closed a projection 125 engages the head and unlocks the film. When the cover is raised, the head is moved back into locking position by the spring 124. A lightproofing barrel 126 and the movable surfaces 127 prevent fogging of the film.

The two foregoing forms of the invention do not have the advantages of operation in timed relation to the starting and stopping of the movement of the film but they are rendered operative without any attention on the part of the operator. As will be readily understood by those skilled in the art the locking devices shown in Figures 6 and 7 may be combined with control means therefor shown in Figures 1, 2 and 5. The cam surfaces would be so positioned that they move into relation with the heads of the locking devices instead of away from such relation in order to unlock the film masses. These locking devices have the very great advantage of having no member which projects beyond the bounding surface of the magazine. Consequently likelihood of a projecting member being broken off is avoided as is difficulty in stacking the magazines. Also no need arises for the provision of a special clip or other manually operated device since the lock is normally in locking position and only by contact with the apparatus is moved therefrom.

Figure 8 is a fragmentary view of a modified form of magazine construction in which it is not necessary to form an opening in the wall of the magazine. In a wall 131 of a magazine a depression 132 is formed but with a portion 133 struck into a slight reverse curve. This portion of the wall projects upwardly but not beyond the surface of the surrounding portions of the wall. Through special spot heat treating or other methods this upstanding projection 133 is made easily displaceable. In other words the portion 133 is a resilient buckle in the wall 131. A toggle such as previously described is provided. A lever 135 is pivoted at 136 and has a head 137 formed at one end and positioned within the upwardly struck projection 133. A depending locking point 138 is normally held in locking position as by a spring 139. It will thus readily be seen that pressure upon the upwardly struck projection 133 will depress the head 137 and raise the locking point 138 thus freeing the mass of the film. When this pressure is removed the spring 139 will replace the point 138 in locking position. Pressure may be applied and removed from the projection 133 in the manner previously shown in Figures 1, 2, 5, 6 and 7.

Figure 10 shows manual means operable from the exterior of a light tight casing for operating the lock and at the same time if desired giving an appropriate and effective signal to the operator. Magazine 13 may be supplied with a locking device of any of the types previously described. As shown this locking device includes a head 142 which projects beyond the periphery of the magazine. A cam surface 143 is formed upon a lever plate 144 which is rotatable by a shaft 145. This shaft in turn is operated by a lever 146 and button 147 operated from the exterior of the casing. Springs 148 return the obturator to light blocking position. Attached to and movable with the shaft 145 is a shutter 149 which when the button 147 is in the locking position obscures the user's vision through a view finder 150. The rotation of the shaft 145 moves the obturator from view-obscuring position and permits the finder to be normally used. In view of the fact that the operator normally looks through his view finder or attempts so to do before he takes a picture, this device gives practical assurance that the lock will be removable from locking position before an attempt is made to begin use of the camera.

I claim:

1. In combination, a film handling apparatus and a film-containing magazine for use therewith; said magazine including a support for a film, a locking member movable to a position wherein one end thereof locks said support against unwanted movement and the other end thereof is accessible at a point adjacent the exterior of the magazine; said apparatus including a receptacle for said magazine, a movable control member so formed and disposed that upon its movement when said magazine is situated within said receptacle it engages and moves said accessible end of said locking member thereby operating said lock, and means operable from the exterior of said apparatus for moving said control member of said apparatus.

2. In combination, a film handling apparatus and a magazine for use therewith; said magazine including a rotatable support for a film, and locking mechanism including movable means so mounted that one portion thereof is movable into a position wherein it locks said support against rotation and another portion thereof is disposed adjacent a wall of the magazine and accessible to a control member carried by said apparatus, said mechanism including spring means for holding said first portion thereof in locking relation to said support; said apparatus including a substantially quadrilateral receptacle for the magazine, a control member mounted adjacent a wall of said receptacle and movable relatively to said receptacle as a whole but so disposed that it leaves the entire receptacle free for the introduction and manipulation of the magazine and also so disposed and shaped that when said magazine is placed within said receptacle upon its movement it engages said accessible portion of said locking mechanism of said magazine and moves it against the power of said spring means thereby releasing said mechanism from holding relation to said support thereby permitting the unwinding of the film, and means for so moving said control member.

3. In a film handling apparatus adapted for the reception of a magazine having means for locking the film contained therewithin against rotation and a control member accessible from a point adjacent the casing of the magazine for operating said locking means, a substantially quadrilateral receptacle for the magazine, a control member mounted adjacent a wall of said receptacle and movable relatively to said receptacle as a whole but so disposed that it leaves the entire receptacle free for the introduction and manipulation of the magazine and also so disposed and shaped that when said magazine is placed within said receptacle upon its movement it may engage and operate said accessible control member of said locking means of said magazine, and means for so moving said control member.

4. In a film handling apparatus, a receptacle for a film magazine having an operable lock for preventing the film from unrolling and a lock control member therefor movable adjacent a wall of said magazine in a direction substantially normal thereto, a control member movable along a wall of said receptacle and substantially parallel thereto and so disposed and shaped that it engages and operates said lock control member when said magazine is situated within its receptacle, and means for moving said control member of said apparatus thereby operating said lock.

5. In combination, a film handling apparatus and a film-containing magazine for use therewith; said magazine including a support for a film, a locking member movable to a position wherein one end thereof locks said support against unwanted movement and the other end thereof is accessible at a point relatively adjacent the exterior of the magazine, means for supporting said locking member for movement to and from said locking position in a direction generally parallel to the axis of said support and generally normal to the adjacent wall of the magazine; said apparatus including a receptacle for said magazine, a control member movable along a surface of said receptacle in a direction parallel to said surface and so disposed and shaped that when said magazine is situated within said receptacle said control member engages and moves said accessible end of said locking member thereby operating said lock and means operable from the exterior of said apparatus for moving said control member of said apparatus whereby said lock is operated.

6. Apparatus including and utilizing a photographic film magazine, means for mounting the magazine within said apparatus, the magazine having a lock for holding the film against movement, and a lock control member for operating said lock, the apparatus having a film feed, a power drive, a motion transmitting train between said drive and said film feed, operable means for disabling an element of said train for locking said train against motion thereby stopping the film feed, a connection between said disabling means and said lock control member made operable by the mounting of said magazine within said apparatus for jointly operating said lock control member of said magazine and said disabling means, and means for operating said disabling means.

7. Apparatus including and utilizing a photographic film magazine, means for mounting the magazine and apparatus in operative relation to each other, the magazine having means for locking the film against movement within the magazine, a movable cam structure for operating the film locking means when the magazine and apparatus are mounted in operative relation to each other, the apparatus having a film feed, a lever the movement of which controls the film feed, means for moving said lever for controlling the feeding of the film, and a connection between the lever and cam structure for operating the cam structure and hence the lock upon the movement of said lever.

8. Apparatus including and utilizing a photographic film magazine, the magazine having a lock for preventing the movement of the film within the magazine and a control for said lock operable from the exterior of the magazine, the apparatus including a receptacle for the magazine, means for feeding a film contained within said magazine, driving means for said film feed, and control mechanism, said control mechanism including a movable control member for applying the power of said driving means to said film feed, said movable member being movable between a first position wherein it starts said film feed and a second position wherein its stops said film feed, a cam structure movable between a first or unlocking and a second or locking position, said cam structure being so disposed in relation to said lock control when said magazine is mounted in said receptacle that when said cam is moved to said first position it operates said lock control to unlock said lock and when said cam is moved to said second position it operates said lock control to lock said lock, and connections between said movable control member and said cam structure for moving said cam structure to said first position when said control member is moved to said second position thereby unlocking the film when the film feed starts and for moving said cam structure to said second position when said control member is moved to said first position thereby locking the film when the film feed stops.

9. In a film handling apparatus, a support for a film from which the film may be unrolled, a lock for preventing such unrolling, a movable control for said lock, means for feeding the film from said support, driving means for said film feed, and control mechanism, said control mechanism including a movable control member for applying the power of said driving means to said film feed, said movable member being movable between a first position wherein it starts said film feed and a second position wherein it stops said film feed, a cam structure movable between a first or unlocking and a second or locking position, said cam structure being so disposed in relation to said lock control that when said cam is moved to said first position it operates said lock control to unlock said lock and when said cam is moved to said second position it operates said lock control to lock said lock, and connections between said movable control member and said cam structure for moving said cam structure to said first position when said control member is moved to said second position thereby unlocking the film when the film feed starts and for moving said cam structure to said second position when said control member is moved to said first position thereby locking the film when the film feed stops.

10. Apparatus including and utilizing a photographic film magazine, said magazine including a support for a film, a spring-urged plunger engaging said support to hold it against movement, said apparatus including means for mounting the magazine thereupon, means for feeding a film, a motor for driving said feeding means, means for controlling the application of the power of said motor to said feeding means, a movable structure with a cam surface which when moved when said magazine is mounted within said apparatus engages and operates said plunger, a connection between said cam structure and said power-controlling means for moving said cam structure by the operation of said power-controlling means, and means for operating said power-controlling means, the movement of said power-controlling means in one direction causing said plunger to be moved against the power of its spring thereby freeing the film-support and in the other direction to be withdrawn thereby freeing said plunger so that its spring is effective to lock said film-support against movement.

11. Apparatus including and utilizing a photographic film magazine, means for mounting the magazine within the apparatus, the magazine having a rotatable support for the film, means for locking said support against rotation, operating mechanism for said lock one portion of which is formed as a headed pin accessible from the exterior of the magazine and another portion of which is movable to a position wherein it engages said support to lock it, and a spring for moving said last-mentioned portion to such locking position; said apparatus including means for feeding the film, control mechanism for starting and stopping said feeding means, a narrow plate with an extremity formed into a bifurcated cam so shaped and positioned that upon movement in a first direction when the magazine is mounted in the apparatus it engages the head of said pin and moves it away from the magazine against the power of the spring thereby unlocking the film, the movement of said bifurcated plate in another or second direction permitting said spring to move said other portion of said operating mechanism to locking position, a connection between said bifurcated plate and said control mechanism for moving said plate in said first direction when the feeding operation is started and in said second direction when the feeding operation is stopped, and means for operating said control mechanism.

12. Apparatus including and utilizing a photographic film magazine, means for mounting the magazine within the apparatus, the magazine having a rotatable support for the film, means for locking said support against rotation, operating mechanism for said lock one portion of which is formed as a headed pin accessible from the exterior of the magazine and another portion of which is movable to a position wherein it engages said support to lock it, a spring for moving said last-mentioned portion to such locking position; said apparatus including a narrow plate with an extremity formed as a bifurcated cam so shaped and positioned that upon movement in a first direction when the magazine is mounted in the apparatus it engages the head of said pin and moves it away from the magazine against the power of the spring thereby unlocking the film, the movement of said bifurcated plate in another or second direction permitting said spring to move said other portion of said operating mechanism to locking position, and means for moving said bifurcated plate.

13. Apparatus including and utilizing a photographic film magazine, the magazine having means for locking the film against movement within the magazine, said locking means including a lock control member engageable by a control member carried by the apparatus, means for mounting the magazine within the apparatus, the apparatus including a film gate through which the film may be fed, said gate comprising a fixed section and a section movable relatively thereto, means for moving said movable gate section in relation to said fixed gate section, a control member operatively connected with said gate-moving means and so disposed that when said magazine is mounted upon said apparatus it engages said lock control of said magazine and operates it whereby the operation of the lock is synchronized with the operation of the gate.

14. In combination in a film handling apparatus, a support from which a film may be unrolled, a gate through which the film upon said support is fed, said gate comprising a fixed member and a member movable relatively thereto, means for moving said movable gate section in relation to said fixed gate section, operable means for locking said film support against rotation, and an operating connection between said gate-opening means and said lock for operating said lock in timed relation to the movement of said gate.

15. In a film handling apparatus, a receptacle for a film-containing magazine of a type having a lock for preventing the unwanted movement of the film within the magazine and an operable lock control member therefor a portion of which is disposed adjacent a wall of the magazine and accessible from the exterior thereof, said apparatus including a sectional gate one section of which is movable relatively to another thereof, a plate movable along a bounding plane of said receptacle parallel to the plane thereof and connected to said movable gate section for moving it, and an operating formation mounted for movement with said plate and so shaped and disposed that when the magazine is placed within said receptacle said formation when moved engages and operates said lock control, and means for so moving said plate thereby moving said formation and operating said lock in timed relation to the movement of said movable gate section.

16. Apparatus including and utilizing a photographic film magazine, the magazine having means for locking the film against movement within the magazine, said locking means including a lock control member engageable by a control member carried by the apparatus, means for mounting the magazine within the apparatus, the apparatus including an apertured member past which the film may be fed, means for feeding the film past the aperture of said member, a movable presser plate for holding the film against said apertured member during the feeding operation, means for moving said movable presser plate into holding relation to said apertured member, a movable control member so disposed that when said magazine is mounted upon said apparatus it engages said lock control member of said magazine and operates it, and means operatively interconnecting said moving means and said movable control member of said apparatus for operating the lock of the magazine in timed relation to the operation of said presser plate.

17. In combination, a film handling apparatus and a film-containing magazine for use therewith; said magazine including a rotatable support for a film, means for locking said support against rotation, and a control member for releasing said lock; and said apparatus including a receptacle for said magazine and a cover therefor, said cover carrying a protuberance which as said cover is closed engages and operates said lock controlling member thereby freeing the film support for rotation.

18. In combination, a film handling apparatus and a film-containing magazine for use therewith; said magazine including a rotatable support for a film, means for locking said support against rotation, and a lock control member for rendering said lock effective; and said apparatus including a receptacle for said magazine and a cover therefor, said cover carrying a formation which when said cover is moved to open position actuates said lock control member for rendering said lock effective.

19. Apparatus including and utilizing a photographic film magazine, the magazine having means for locking the film against movement within the magazine, said locking means including a lock control member engageable by a control member carried by the apparatus, said apparatus including a receptacle wherein said magazine may be placed, an apertured gate member forming part of a bounding wall of said receptacle past which the film contained within said magazine may be fed, means for so feeding the film, a member movable to an operating position wherein it presses the film against the aperture of said gate member during the feeding operation, means for moving said presser member to said operating position, a structure movable to an operative position wherein it closes said receptacle against the action of light, a control member disposed adjacent a bounding wall of said receptacle and movable to an operative position wherein when the magazine is disposed within said receptacle it engages and operates said lock control member of the magazine, means for moving said control member to said operative position, and a latch operatively interconnected with said means for moving said presser member, said closure, and said control member of said apparatus for maintaining each thereof in said operative positions after they have been moved thereto.

20. In combination, a camera and a film-containing magazine for use therewith; said camera including a finder lens, means normally operative for disabling said finder lens, means for rendering said disabling means inoperative whereby a user of the camera may employ said finder lens, and means for mounting said magazine within said camera; said magazine including a lock for preventing the unwanted unrolling of the film within said magazine and means for controlling said lock; and a connection effective when said magazine is mounted within said camera between said means for rendering said disabling means inoperative and said lock controlling means for jointly operating both of said means whereby the user of the camera unlocks the film ready for use when the finder is made usable.

21. In a camera having a receptacle for a film-containing magazine having a lock for preventing the unwanted unrolling of the film within said magazine and means for controlling said lock, a finder lens, means normally operative for disabling said finder lens, means for rendering said disabling means inoperative whereby a user of the camera may employ said finder lens, a member movable to a position wherein when said magazine is disposed within said receptacle said lock controlling means of said magazine is operated, and a connection between said means for rendering said disabling means inoperative and said lock controlling means for jointly operating both of said means.

22. In a camera having a receptacle for a film-containing magazine, a receptacle for said magazine, a lens, a shutter movable to a position wherein it prevents light from passing through said lens, means for moving said shutter to said position, and means necessarily operated by the removal of the magazine from said receptacle for actuating said shutter-moving means.

23. In combination, a film handling apparatus and a magazine for use therewith; said magazine including a rotatable support for a film, and locking mechanism including movable control means, a mounting therefor so disposed that one portion thereof is movable into a position wherein it locks said support against rotation and another portion thereof is disposed adjacent a wall of the magazine and accessible to a control member carried by said apparatus, and light trapping means associated with said accessible end of said control means for preventing the entry of light into said magazine, said mechanism including spring means for holding said first mentioned portion of said mounting in locking relation to said support; said apparatus including a substantially quadrilateral receptacle for the magazine, a control member mounted adjacent a wall of said receptacle and movable relatively to said receptacle as a whole but so disposed that it leaves the entire receptacle free for the introduction and manipulation of the magazine and also so disposed and shaped that when said magazine is placed within said receptacle upon its movement it engages said accessible portion of said locking mechanism of said magazine and moves it against the power of said spring means thereby releasing said mechanism from holding relation to said support thereby permitting the unwinding of the film, and means for so moving said control member.

24. A film magazine for use in a film handling apparatus said film magazine containing a revoluble film support and locking means for preventing the rotation of said support, said locking means including a pivoted lever one end of which is normally spring-urged into engagement with said film support and the other end of which presents an operating head for engagement by operating means for said lock carried by said apparatus.

25. A film magazine for use in a film handling apparatus said film magazine containing a revoluble film suport and locking means for preventing the rotation of said support, said locking means including a pivoted lever one end of which is normally spring-urged into engagement with said film support and the other end of which presents an operating head for engagement by operating means for said lock carried by said apparatus, a depending skirt carried by said lever, the border of said skirt being returned outwardly to embrace the border of a relatively stationary sleeve around the head, the skirt and sleeve conjointly forming a light trap or baffle.

26. For use in a film handling apparatus, a film magazine comprising a revoluble film support, a lock therefor, and means engageable from the exterior of said magazine for operating said lock, said film engaging means being placed adjacent to the inner surface of a locally displaceable but imperforate portion of the magazine casing.

27. In combination, a film handling apparatus and a film-containing magazine for use therewith, said film-containing magazine comprising a rotatable support for a film and means for locking said support against rotation, said locking means including a control member which extends to a point adjacent the inside surface of a locally displaceable but imperforate section of the magazine casing and said apparatus including a movable projecting formation so placed that upon its movement when said magazine is mounted within said apparatus said portion of said magazine adjacent said control member is displaced and said lock is operated, and means for moving said formation.

28. In combination, a film handling apparatus and a film-containing magazine for use therewith; said film-containing magazine comprising a rotatable support for a film and a spring-pressed plunger one end of which engages said support for locking it against rotation and the other end of which extends to a point adjacent the inside surface of a locally displaceable but imperforate section of the magazine casing; and said apparatus including means for mounting said magazine within said apparatus, a formation so shaped and disposed that upon the movement thereof when said magazine is mounted within said apparatus it displaces said portion of said magazine thereby moving said displaceable portion so that it engages said other end of said plunger and moves said plunger against its spring thereby releasing said lock, and means for moving said formation.

29. In a film handling apparatus, a rotatable support from which a film may be unrolled, a lock for holding said support against rotation, an apertured member, means for feeding the film past said apertured member, means for closing said aperture against the admission of light to the film, and control mechanism interlocking said closing means and said lock for locking said rotatable support in timed relation to the operation of said means for closing said aperture against the admission of light.

30. In combination, a film handling apparatus and a film-containing magazine; said magazine containing a rotatable support from which a film may be unrolled, means for locking said support against rotation, and a lock control member for operating said lock; said apparatus including a receptacle for the magazine, an apertured member, means for feeding the film past the aperture, means for closing the aperture against the admission of light to the film, means for moving said closure in relation to said aperture, a movable formation so disposed that upon movement when the magazine is situated within said receptacle it engages and operates said lock control member of said magazine, and control means operatively interconnecting said closure-moving means and said formation for concomitantly operating both thereof.

31. In combination, a film handling apparatus and a film-containing magazine; said magazine containing a rotatable support from which a film may be unrolled, means for locking said support against rotation, and a lock control member for releasing said lock; said apparatus including a receptacle for the magazine, an apertured member, means for feeding the film past the aperture, means normally effective for closing the aperture against the admission of light to the film, means for moving said closure so that light reaches said aperture, a movable formation so disposed that upon movement when the magazine is situated within said receptacle it engages and operates said lock control member of said magazine, and control means operatively interconnecting said closure-moving means and said formation for concomitantly operating both thereof thereby releasing said lock in timed relation to the admission of light to the film.

WARREN DUNHAM FOSTER.